G. P. MORRILL.
Tool-Handle Attachment.

No. 207,671.   Patented Sept. 3, 1878.

Witnesses
S. N. Piper
John Robinson

Inventor.
George P. Morrill.
by his attorney.
R. H. Eddy

UNITED STATES PATENT OFFICE.

GEORGE P. MORRILL, OF CANTERBURY, NEW HAMPSHIRE.

IMPROVEMENT IN TOOL-HANDLE ATTACHMENTS.

Specification forming part of Letters Patent No. 207,671, dated September 3, 1878; application filed July 24, 1878.

*To all whom it may concern:*

Be it known that I, GEORGE P. MORRILL, of Canterbury, of the county of Merrimack, of the State of New Hampshire, have invented a new and useful Improvement in Hammer or Tool Head and Handle Attachments; and do hereby declare the same to be described in the following specification and represented in the accompanying drawings, of which—

Figure 1:
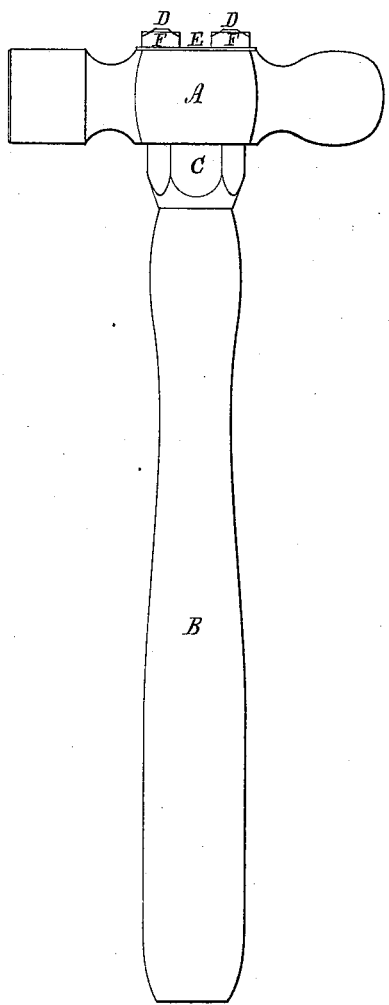
Figure 2:
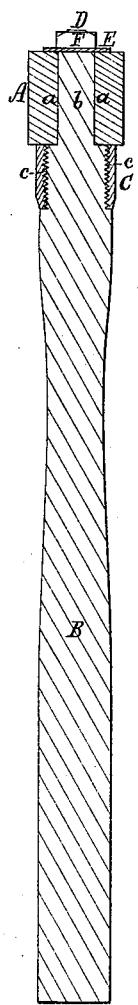
Figure 3:
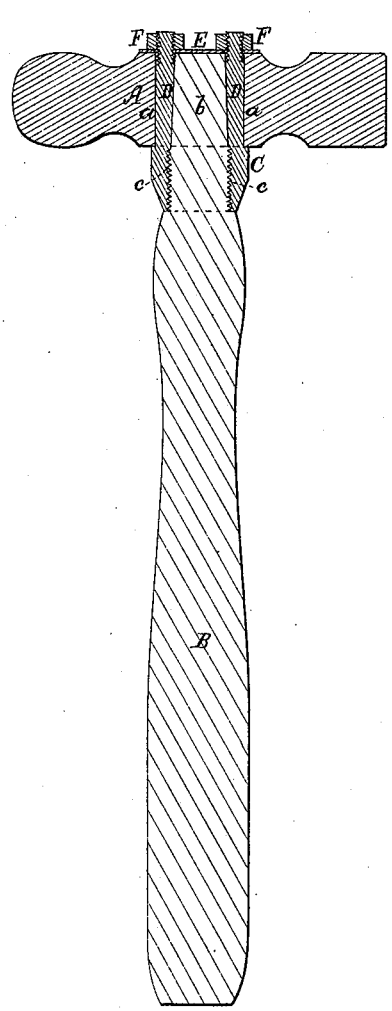

Figure 1 is a side view, and Figs. 2 and 3 a longitudinal section, of a hammer having its handle and head provided with my improved means of connecting them.

The attachment, as shown, consists in a collar provided with a female screw and two projecting screws with their nuts, and also having a cap-plate, such devices being for use with the handle and head, substantially as hereinafter explained.

There are various other implements besides hammers to which my invention is equally applicable, as adzes or hatchets, for instance.

In the drawings, A denotes the head, and B the handle, of a hammer, the said head being mortised at *a* to receive a tenon, *b*, from the handle, such tenon being rectangular, or thereabout, in its transverse section. Before inserting the tenon into the mortise or eye of the head there is screwed on the handle, so as to have its top even with the base or shoulder of the tenon, a collar, C, having a female screw, *c*, formed in its inner periphery. This collar I usually construct prismatic on its outer surface, and tapering, as represented. From the upper edge of the collar two screws, D D, extend up through the eye of the head and on opposite edges of the tenon, as shown, such screws going through a cap-plate, E, and receiving upon them two nuts, F F. The cap-plate extends across and covers the upper end of the eye of the head. Instead, however, of having such cap-plate, the eye may not be extended entirely through the head, in which case the nuts would be screwed directly against the head; or the cap-plate may be dispensed with, and the vertex or eye and the tenon may be continued through the head, the nuts being turned down against the head and end of the tenon.

It will be seen that the tenon and eye, when together, prevent the collar from being revolved on the handle.

By hammering down or upsetting the ends of the screws D D upon the nuts F F, the latter may be prevented from being accidentally turned back or working loose on the screws while the hammer may be in use.

The collar C may be made without any internal screw, and be fastened to the handle by one or more rivets going through it (the said collar) and the said handle; but it is far preferable to have it provided with the screw, to screw directly upon the handle, as in such case the latter does not become weakened by a rivet hole or holes going through it.

The above-described means of attaching a hammer or tool head to its handle is a very efficient one in practice, not only in supporting the head, but in rendering it difficult, if not impossible, for it to work loose on the handle, or the handle to become worn, split, or cracked at or near its junction with the head.

Though somewhat analogous to the ax-handle attachment shown in the United States Patent No. 70,284, my hammer head and handle attachment differs materially therefrom, inasmuch as both of the screws D D are fixed to and extended directly from the nut C, and such nut is screwed or so fixed on the handle as to serve as a shoulder or bearing for the head A, against which it is forced by the nuts F.

I claim as my invention as follows:

1. In combination with the tool-head provided with the eye or mortise and the handle having the tenon therefor, the screw-collar and its screws and nuts, arranged with such tenon and mortise, as set forth.

2. In combination with the tool-head provided with the eye or mortise and the handle having the tenon therefor, the screw-collar and its screws and nuts and the cap-plate, arranged with such head and with the tenon and mortise, as specified.

GEO. P. MORRILL.

Witnesses:
R. H. EDDY,
JOHN R. SNOW.